(12) United States Patent
Haack et al.

(10) Patent No.: US 11,634,205 B2
(45) Date of Patent: Apr. 25, 2023

(54) FRAME COMPONENT AND METHOD FOR PRODUCING A FRAME COMPONENT, FRAME AND FUSELAGE STRUCTURE FOR AN AIRCRAFT

(71) Applicant: Premium Aerotec GmbH, Augsburg (DE)

(72) Inventors: Cord Haack, Augsburg (DE); Carsten Paul, Augsburg (DE); Bernhard Hörger, Augsburg (DE)

(73) Assignee: Premium Aerotec GmbH, Augsburg (DE)

( * ) Notice: Subject to any disclaimer, the term of this patent is extended or adjusted under 35 U.S.C. 154(b) by 228 days.

(21) Appl. No.: 16/944,535

(22) Filed: Jul. 31, 2020

(65) Prior Publication Data

US 2021/0031897 A1 Feb. 4, 2021

(30) Foreign Application Priority Data

Jul. 31, 2019 (DE) ...................... 10 2019 211 434.2

(51) Int. Cl.
*B64C 1/12* (2006.01)
*B64C 1/06* (2006.01)
*B64C 1/00* (2006.01)

(52) U.S. Cl.
CPC .............. *B64C 1/061* (2013.01); *B64C 1/064* (2013.01); *B64C 1/12* (2013.01); *B64C 2001/0081* (2013.01)

(58) Field of Classification Search
CPC ..................................................... B64C 1/061
See application file for complete search history.

(56) References Cited

U.S. PATENT DOCUMENTS

| 5,518,208 A | 5/1996 | Roseburg |
| 7,686,249 B2 | 3/2010 | Luttig et al. |

(Continued)

FOREIGN PATENT DOCUMENTS

| DE | 10 2007 021 075 A1 | 11/2008 |
| DE | 10 2007 021 075 B4 | 6/2012 |

(Continued)

OTHER PUBLICATIONS

Chinese Office Action for Application No. 202021570967.0 dated Aug. 24, 2021.

(Continued)

*Primary Examiner* — Alexander S Thomas
(74) *Attorney, Agent, or Firm* — KDW Firm PLLC (57) ABSTRACT

A frame component for a frame of a fuselage structure of an aircraft includes a central web extending along a longitudinal direction and having an inner edge region with respect to a radial direction running transversely with respect to the longitudinal direction and an outer edge region with respect to the radial direction. An inner web is bent from the inner edge region of the central web towards a first side. An outer web is bent from the outer edge region of the central web towards the first side. The central web, the outer web and the inner web are produced integrally from a metal sheet and together define a C-shaped cross section of the frame component. At least one stringer recess is formed in the outer web and in the outer edge region of the central web. The central web has, in the region of the stringer recess, a first reinforcing formation which forms a protrusion on the first side of the central web.

20 Claims, 8 Drawing Sheets

(56) References Cited

U.S. PATENT DOCUMENTS

| | | |
|---|---|---|
| 8,540,190 B2 | 9/2013 | Paul et al. |
| 2010/0327113 A1 | 12/2010 | Marquez Lopez et al. |
| 2015/0367929 A1 | 12/2015 | Mialhe et al. |
| 2018/0016251 A1 | 6/2018 | Dopker et al. |
| 2019/0193830 A1 | 6/2019 | Yadav et al. |

FOREIGN PATENT DOCUMENTS

| | | |
|---|---|---|
| DE | 102019111836 A1 * | 11/2020 |
| EP | 0 469 909 A1 | 2/1992 |

OTHER PUBLICATIONS

German Office Action for Application No. 10 2019211434.2 dated Mar. 28, 2020.
European Search Report for Application No. 20188574.6 dated Dec. 14, 2020.

* cited by examiner

FRAME COMPONENT AND METHOD FOR PRODUCING A FRAME COMPONENT, FRAME AND FUSELAGE STRUCTURE FOR AN AIRCRAFT

CROSS-REFERENCE TO RELATED APPLICATION

This application claims priority to German patent application DE 10 2019 211 434.2 filed Jul. 31, 2019, the entire disclosure of which is incorporated by reference herein.

TECHNICAL FIELD

The disclosure herein relates to a frame component for a frame of a fuselage structure of an aircraft, to a method for producing the frame component, to a frame and to a fuselage structure for an aircraft.

BACKGROUND

A fuselage of an aircraft typically has a fuselage structure which comprises a plurality of frames, which are arranged parallel to one another and surround a fuselage longitudinal axis, and stringers extending along the fuselage longitudinal axis. An outer skin is generally fastened to the stringers and to the frames. Frames exist in various cross-sectional forms, for example as Z profiles or as T profiles. In addition, frames generally have stringer recesses through which the stringers extend. The outer skin is typically connected to the frames by clips. These are substantially L-shaped fittings which are each riveted or screwed to the outer skin and to the frame.

U.S. Pat. No. 5,518,208 A describes a frame for an aircraft, comprising a central web, an inner web which is arranged at an inner end of the central web and together with the central web defines a T-shaped cross section, and comprising outer webs which are arranged at an outer end of the central web, extend in an alternating manner to a first and a second side of the central web and are arranged spaced apart from one another along a longitudinal direction of the central web. A stringer recess is arranged at the outer end of the central web between two adjacent outer webs. Furthermore, a rib is formed on the central web, between the inner end and the stringer recess. In the assembly to form an aircraft fuselage, a stringer extends through the stringer recess, and a connecting plate, which is provided for connecting to an outer skin, is riveted onto the stringer and onto the outer webs of the frame.

It is an object of the disclosure herein to find improved solutions for a frame of a fuselage structure of an aircraft. One of the concepts of the disclosure herein is in particular to find a frame which can be produced and can be mounted in a simple and efficient manner.

SUMMARY

This object is achieved in each case by the subject matter disclosed herein.

According to a first aspect of the disclosure herein, a frame component for a frame of a fuselage structure of an aircraft is provided. The frame component according to the disclosure herein has a central web which extends along a longitudinal direction, has an inner edge region with respect to a radial direction running transversely with respect to the longitudinal direction, and an outer edge region with respect to the radial direction. The central web is therefore realized in the form of a plate and can extend in particular in an arcuate manner along the longitudinal direction. A first surface of the central web defines a first side. A second surface of the central web that is oriented in an opposed manner to the first surface defines a second side. A thickness of the central web is measured in a thickness direction, which runs transversely with respect to the longitudinal direction and transversely with respect to the radial direction, between the first and the second surface and can be, for example, within a range of between 1.0 mm and 3.5 mm.

The frame component furthermore comprises an inner web which is bent from the inner edge region of the central web towards the first side and an outer web which is bent from the outer edge region of the central web towards the first side, wherein the central web, the outer web and the inner web are produced integrally from a metal sheet and together define a C-shaped cross section of the frame component. The inner web therefore extends from the inner edge region of the central web and transversely with respect thereto on the first side. The outer web extends from the outer edge region of the central web and transversely with respect to the central web and likewise on the first side of the central web. The inner web and the outer web can therefore run parallel or substantially parallel to one another. In particular, the central web, the inner web and the outer web are produced from one and the same metal sheet, the thickness of which can be, for example, within a range of between 1.0 mm and 3.5 mm, by forming or bending over. The metal sheet can in particular have a constant thickness. Examples of suitable material for the metal sheet are aluminum alloys or titanium alloys.

Furthermore, the frame component has at least one stringer recess which is formed in the outer web and in the outer edge region of the central web. The stringer recess serves for receiving a stringer extending transversely with respect to the central web and forms an interruption in the outer web along the longitudinal direction and, in the central web, an opening extending between the first and the second surface.

According to the disclosure herein, the central web has, in the region of the stringer recess, a first reinforcing formation which forms a protrusion on the first side of the central web. Accordingly, the central web has, in the region of the stringer recess, a structure which protrudes in the thickness direction, as a result of which a flexural rigidity of the central web in the region of the stringer recess, in which the outer web is interrupted, is increased.

According to a second aspect of the disclosure herein, a frame for a fuselage structure of an aircraft is provided, which frame has at least two frame components according to the first aspect of the disclosure herein, wherein the frame components are connected to one another at connecting regions arranged in an opposed manner with respect to the longitudinal direction, and form a closed frame structure, and wherein the first side of the central web of a first frame component is connected to a second side of the central web of a second frame component. The frame components which are connected to one another therefore overlap in their respective connecting region with respect to the longitudinal direction. The first surface of the central web of the first frame component lies here against the second surface of the central web of the second frame component. The first and the second frame component can be connected to one another, for example, by rivets, bolts, screws or in a similar manner.

According to a third aspect of the disclosure herein, a fuselage structure for an aircraft is provided, which fuselage structure has at least two frames arranged parallel to one another according to the second aspect of the disclosure herein. The frames define a fuselage longitudinal axis. The fuselage structure furthermore has least one stringer which runs along the fuselage longitudinal axis and is arranged in the stringer recesses of the frames.

According to a fourth aspect of the disclosure herein, a method for producing a frame component according to the first aspect of the disclosure herein is provided. The method comprises forming a circumferential edge, which defines the at least one stringer recess, on a metal sheet by a machining process. The metal plate here is to a certain extent cut to size or is generally machined into a geometric form which corresponds to a developed view of the frame component. Machining processes used can be in particular milling or punching. An advantage of milling resides in a multiplicity of sheets being able to be stacked and simultaneously worked on.

In a further step, the central web, the inner web and the outer web are formed by bending over rim regions, which extend from the circumferential edge, relative to a central region of the metal sheet, the central region forming the central web. Furthermore, the first reinforcing formation is formed by deforming the central web. Accordingly, those regions of the metal sheet which are opposed with respect to the radial direction are bent over, and the reinforcing formation is likewise produced by a forming step.

A concept on which the disclosure herein is based relates to providing a frame component with a C-shaped cross section, the frame component being produced integrally by forming of a metal sheet. The inner and outer flanges or inner and outer webs defining the C-shaped cross section therefore protrude in the same direction from a central web which connects the inner web and the outer web. In the region of a stringer recess which interrupts the outer flange or the outer web of the frame component, a reinforcing formation is formed by forming, the reinforcing formation extending at least in sections along the longitudinal direction and protruding from the central web in the same direction as the inner web and the outer web. All of the structured formed by forming are therefore arranged on the same side of the central web.

One of the advantages of the disclosure herein resides in the fact that a frame component comprising a central web, inner web, outer web and reinforcing formation is produced integrally from a metal sheet. Since all of the structures formed by forming are arranged on the same side of the central web, the structures can be produced very efficiently in a bending or forming process. In particular, this can take place in a single forming step and optionally even without changing tools, as a result of which an extremely rapid production of high piece numbers is made possible. Furthermore, excellent mechanical rigidity of the frame component is achieved by the reinforcing formation. Since the reinforcing formation is likewise produced by forming of the metal sheet, it is also here an integral structure of the frame component, thus further simplifying the production process. The C-shaped cross section of the frame component makes it possible for a frame to be formed in a simple manner as a closed frame structure from a plurality of frame components by the ends of the individual frame components being pushed one into another.

Advantageous refinements and developments emerge from the description herein. The features and advantages disclosed for one aspect of the disclosure herein are each also considered to be disclosed for the other aspects of the disclosure herein.

According to one embodiment of the frame component, the first reinforcing formation can be in the form of a bead which is introduced from a second side of the central web, is arranged with respect to the radial direction between the inner edge region and the stringer recess and runs along the longitudinal direction of the central web. Accordingly, the central web has a bead which runs with respect to the radial direction along the longitudinal direction below the stringer recess. The bead is formed by the second surface of the central web forming a, for example, concave depression and the first surface of the central web forming a curvature which is correspondingly convex with respect thereto. The formation of the first reinforcing structure as a bead affords the advantage that a type of reinforcing rib is therefore formed in a plate-like region of the central web. Such a bead can be produced particularly simply, for example by a punch, and improves the rigidity of the central web in the region of the stringer recess in a highly efficient manner.

According to a further embodiment of the frame component, it can be provided that the first reinforcing formation is formed by a recess edge of the central web defining the stringer recess being at least partially angled towards the first side. Accordingly, an edge of the central web that defines the stringer recess is bent over towards the first side. An edge defining the stringer recess therefore protrudes over the central web in the first direction. The reinforcing formation is therefore formed directly on the stringer recess, as a result of which the rigidity is advantageously increased at the point where the outer web is interrupted.

In general, the frame component can have a plurality of stringer recesses spaced apart along the longitudinal direction. A reinforcing formation, for example in the form of a bead or an angling of the recess edge, can optionally be formed on each of the stringer recesses. In particular, reinforcing formations formed in various ways on various stringer recesses can be provided.

According to a further embodiment, it can be provided that at least one second reinforcing formation in the form of a bead, which is introduced from a second side of the central web and forms a protrusion on the first side of the central web, is formed in a bent region connecting the inner edge region of the central web and the inner web. Accordingly, a bead is formed on a curved transition region between the central web and the inner web. A channel formed between the central web and the inner web therefore has a protrusion spanning the channel. A corresponding depression is formed on the outer radius corresponding to the channel. The flexural rigidity of the inner web relative to the central web is therefore advantageously increased. The mechanical rigidity of the frame component as a whole is thus improved further. A further advantage resides in the fact that the second reinforcing formation is in the form of a bead which is introduced from a second side of the central web since the bead can be produced in a simple manner by forming. The production of the frame component is therefore simplified further since the second reinforcing formation is also in the form of an integral structure of the metal sheet. Optionally, a plurality of second reinforcing formations which are arranged spaced apart from one another along the longitudinal direction can be provided. The flexural rigidity of the inner web relative to the central web is therefore increased further.

According to a further embodiment of the frame component, it can be provided that the frame component has a connecting region for connection to a further frame component, which connecting region forms one end of the frame component in the longitudinal direction, and wherein the central web, at an end region adjoining the connecting region with respect to the longitudinal direction, has a third reinforcing formation in the form of a bead which is introduced from a second side of the central web, forms a protrusion on the first side of the central web and at least partially extends along the radial direction. The connecting region is provided for overlapping with the connecting region of a further frame component. Optionally, the central web can be formed in the connecting region so as to be tapered in relation to the end region with respect to the radial direction, which facilitates pushing of two frame components one inside the other. The third reinforcing formation can be designed like the first reinforcing formation as an elongate bead, wherein the first surface of the central web forms an elevation and the second surface of the central web forms a corresponding depression. Since the bead forming the third reinforcing formation runs at least in sections along the radial direction, the torsional rigidity of the frame component is advantageously increased in a region positioned adjacent to the connecting region.

According to one embodiment, the third reinforcing formation can extend between the inner web and the outer web. In particular, the bead forming the third reinforcing formation can be designed as an elongate bead running rectilinearly.

According to a further embodiment, the third reinforcing formation can have a first region extending from the inner web along the radial direction, a second region which extends along the outer web and is optionally interrupted by a stringer recess, and a transition region connecting the first and the second region. Accordingly, the bead forming the third reinforcing formation runs in an approximately L-shaped manner.

According to a further embodiment, it can be provided that the connecting region of the frame component is arranged relative to the end region of the frame component with an offset with respect to the thickness direction extending transversely with respect to the radial direction and with respect to the longitudinal direction. The central web therefore has a step connecting the end region and the connecting region. Therefore, when two frame components are connected in an overlapping arrangement of the connecting regions, a substantially planar or aligning arrangement of the second surfaces of the central webs can be achieved, which is favourable for the force flow.

According to a further embodiment, the frame component has at least one optional reinforcing bracket which is connected to the second side of the central web in the outer edge region and is arranged adjacent to the stringer recess with respect to the longitudinal direction. The reinforcing bracket has in particular an L-shaped cross section, wherein a first lug of the reinforcing bracket is connected to the central web and a lug protruding transversely from the first lug can be arranged in alignment with the outer web. The reinforcing angle can in particular be riveted to the central web. The flexural rigidity of the frame component is advantageously further increased by the L-shaped cross section.

According to a further embodiment, the frame component can have a reinforcing profile which is connected to the second side of the central web. The reinforcing profile can have in particular a plate portion, which extends between the inner edge region and the outer edge region of the central web, and a transverse web, which extends transversely with respect to the plate portion and is arranged in the outer edge region of the central web, wherein the plate portion and the transverse web have a profile stringer recess formed in a corresponding manner to the stringer recess. Accordingly, an L-shaped profile is fastened to the second side or to the second surface of the central web, wherein the transverse web of the profile can be arranged, for example, in alignment with the outer web. The plate portion optionally extends over an entire width of the central web in the radial direction. The reinforcing profile, because of its L-shaped cross section, therefore ensures a further improvement in the flexural rigidity. At the same time, a thickness of the frame component in the region of the central web is increased. This facilitates the fastening of additional components, for example crossmembers for holding floors or connecting rods for holding on-board monuments or the like.

According to one embodiment, the fuselage structure can have an outer skin which is connected to the outer webs of the frame components of the frames. The outer skin can be realized by one or more thin panels or in general as an arrangement of components which extend in a planar manner and are in each case fastened to the outer webs, for example are riveted thereto. The outer skin is optionally additionally fastened to the stringers.

According to one embodiment of the method for producing the frame component, it can be provided that the circumferential edge is bent over, and the central web deformed, in one step. This is advantageously possibly because inner web, outer web and first reinforcing formation are all formed on the first side. The efficiency of the production process is therefore improved further. The metal sheet can be formed in particular in a mould, for example by deep drawing, pressing or superplastic forming.

With regard to directional indications and axes, in particular directional indications and axes relating to the profile of physical structures, a path of an axis, of a direction or of a structure "along" another axis, direction or structure is understood here as meaning that these, in particular the tangents that arise at a respective point of the structures, run in each case at an angle of less than 45 degrees, preferably less than 30 degrees, and particularly preferably parallel, to one another.

With regard to directional indications and axes, in particular directional indications and axes relating to the profile of physical structures, a path of an axis, of a direction or of a structure "transversely" with respect to another axis, direction or structure is understood here as meaning that these, in particular the tangents that arise at a respective point of the structures, run in each case at an angle of greater than or equal to 45 degrees, preferably greater than or equal to 60 degrees, and particularly preferably perpendicular, to one another.

Components or structures formed "in one piece", "in one part", "integrally" or "as one piece" are generally understood herein as meaning that these components or structures are present as a single part forming a material unit and in particular are produced as such, wherein it is not possible to detach one component from the other component without destroying the material cohesion.

BRIEF DESCRIPTION OF THE DRAWINGS

The disclosure herein is explained below with reference to the figures of the drawings. In the figures.

In the figures, the same reference signs denote identical or functionally identical components unless otherwise stated.

DETAILED DESCRIPTION

Figure 1:
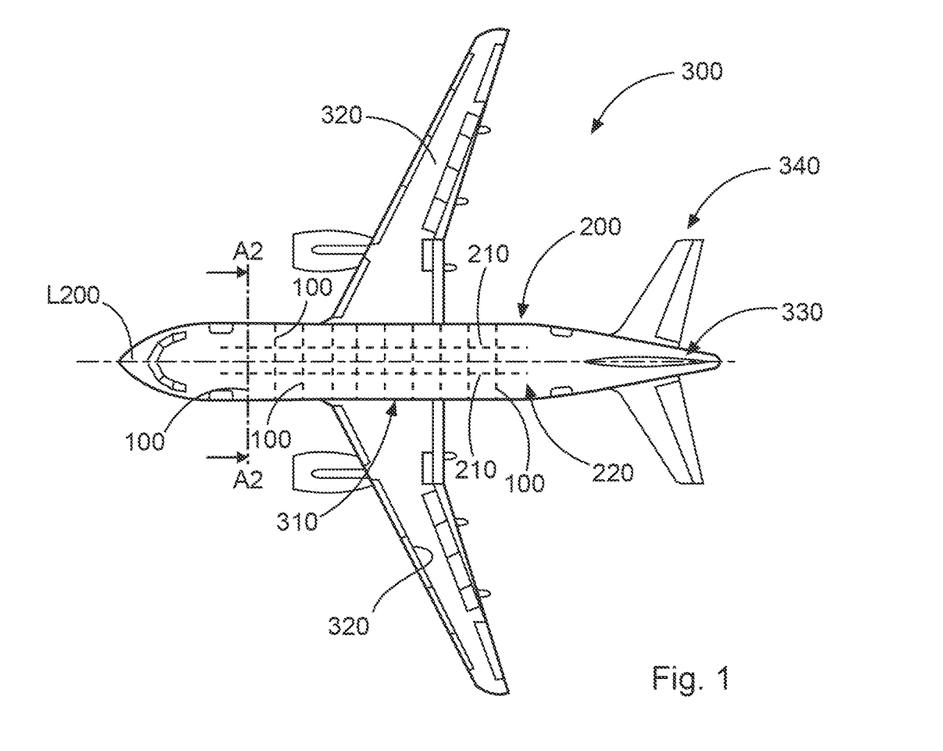
FIG. 1 shows a schematic view of an aircraft which has a fuselage structure according to an exemplary embodiment of the disclosure herein.

FIG. 1 schematically shows a top view of an aircraft 300. The aircraft 300 has a fuselage 301 which is substantially cylindrical at least in sections, extends along a fuselage longitudinal axis L200 and from which wings 320, a vertical tail 330 and a tail plane 340 extend. The fuselage 310 has a fuselage structure 200 comprising a plurality of frames 100, stringers 210 and an outer skin 220. The frames 100 and stringers 210 are illustrated merely symbolically in FIG. 1 by dashed lines. As can be seen in FIG. 1, at least two frames 100 are provided and the latter are arranged spaced apart and parallel to one another along the fuselage longitudinal axis L200. The stringers 210 extend transversely with respect to the frames 100 along the fuselage longitudinal axis L200.

Figure 2:
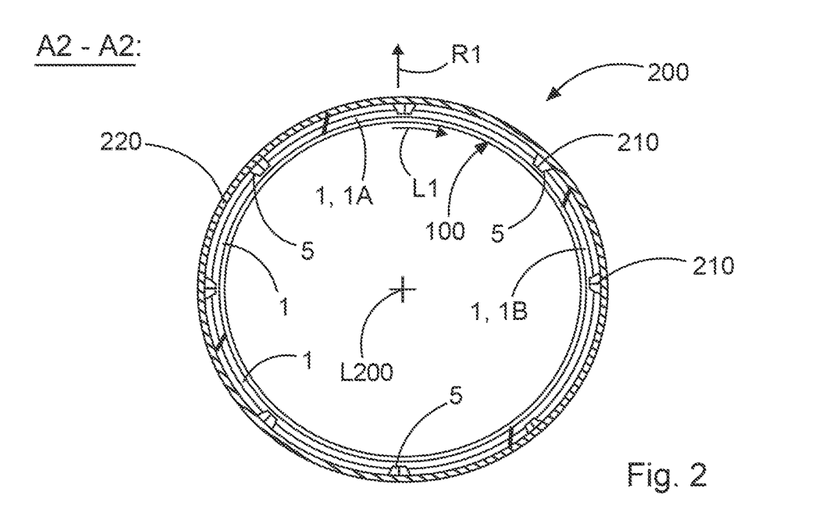
FIG. 2 shows a simplified, schematic sectional view of the fuselage structure according to an exemplary embodiment of the disclosure herein, the sectional view arising in a section along the line A2-A2 shown in FIG. 1.

FIG. 2 schematically shows a sectional view of the fuselage structure 200. As is shown schematically in FIG. 2, the frames 100 in each case form a closed frame structure which defines the fuselage cross section or defines and surrounds the fuselage longitudinal axis L200. As can also be seen in FIG. 2, the frame 100 is composed of a plurality of interconnected frame components 1. The frame components 1 have at least one stringer recess 5 in which the stringer 210 is accommodated. The outer skin 220 is fastened to the frames 100, for example is riveted and/or adhesively bonded thereto, and can optionally additionally be fastened to the stringers 210, for example can be riveted and/or adhesively bonded thereto.

Figure 3:
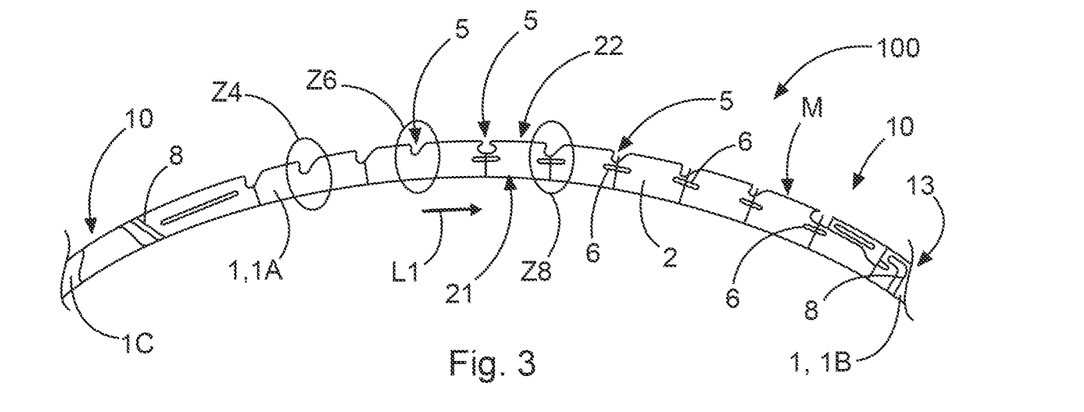
FIG. 3 shows a broken-away sectional view of a fuselage structure according to an exemplary embodiment of the disclosure herein.

FIG. 3 is a purely schematic illustration of a broken-off view of a frame 100 that is more detailed in comparison to FIG. 2. As already explained, the frame 100 is composed of a plurality of frame components 1. FIG. 3 shows by way of example a first frame component 1A which is connected at a first end to a second frame component 1B and at a second end to a third frame component 1C. The frame component 1 is explained in detail below.

Figure 4:
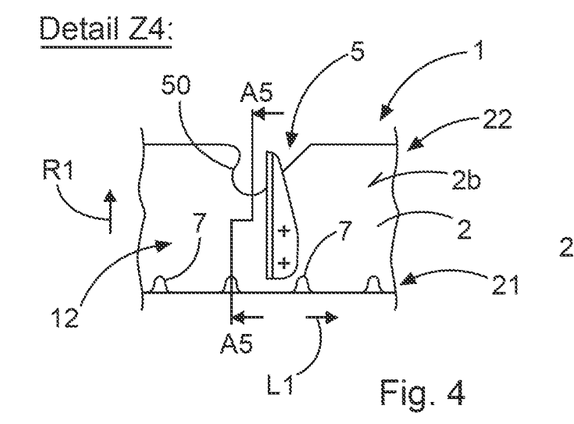
FIG. 4 shows a detail view of the region, identified by the characters Z4, of a frame component according to an exemplary embodiment of the disclosure herein of the fuselage structure shown in FIG. 3.
Figure 5:
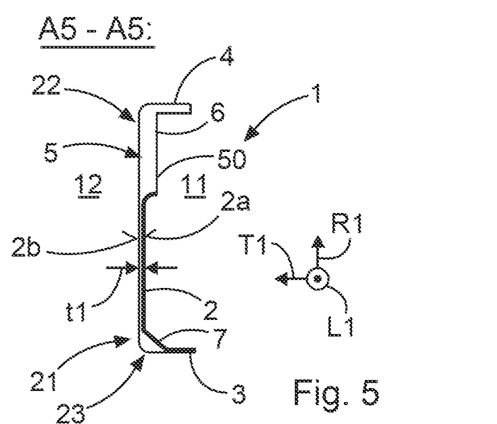
FIG. 5 shows a sectional view of the frame component shown in FIG. 4, the sectional view arising in a section along the line A5-A5 shown in FIG. 4.
Figure 6:
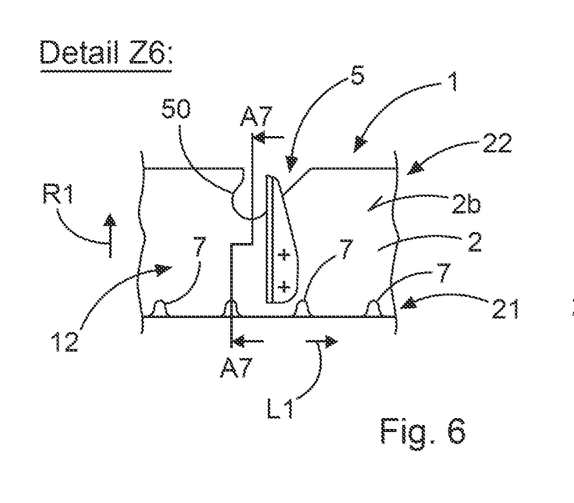
FIG. 6 shows a detail view of the region, identified by the characters Z6, of a frame component according to an exemplary embodiment of the disclosure herein of the fuselage structure shown in FIG. 3.
Figure 7:
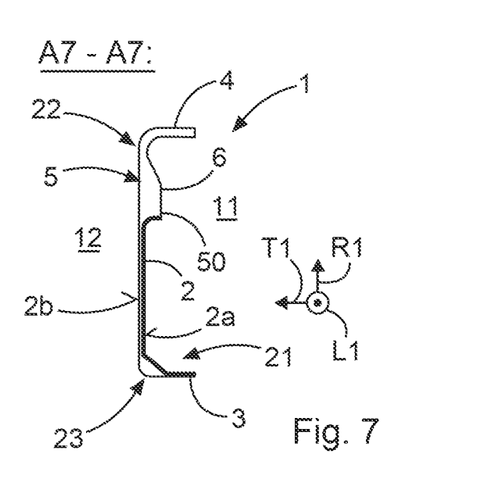
FIG. 7 shows a sectional view of the frame component shown in FIG. 6, the sectional view arising in a section along the line A7-A7 shown in FIG. 6.
Figure 8:
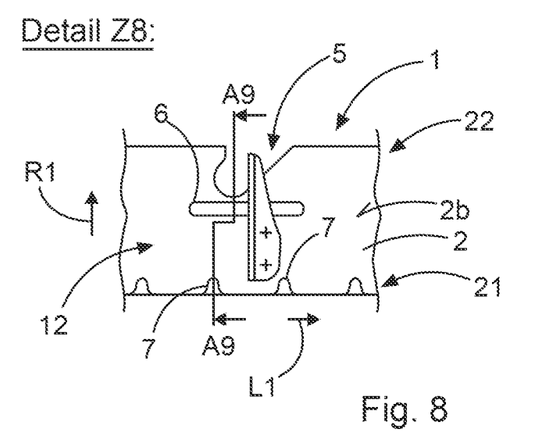
FIG. 8 shows a detail view of the region, identified by the characters Z8, of a frame component according to an exemplary embodiment of the disclosure herein of the fuselage structure shown in FIG. 3.
Figure 9:
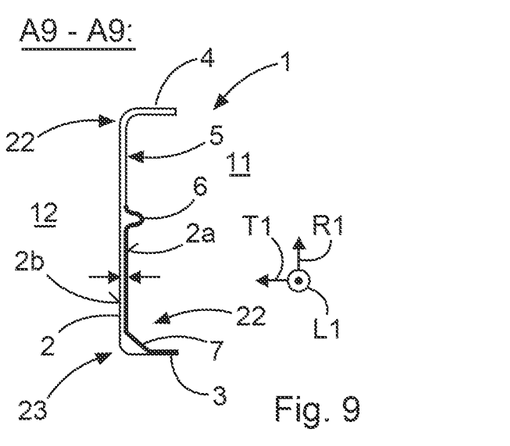
FIG. 9 shows a sectional view of the frame component shown in FIG. 8, the sectional view arising in a section along the line A9-A9 shown in FIG. 8.

As can be seen in FIG. 3, the frame component 1 extends in an arcuate manner along a longitudinal direction L1. FIGS. 4, 6 and 8 each show detail views of the frame component 1 at various locations with respect to the longitudinal axis L1. FIGS. 5, 7 and 9 each show associated sectional views. As can be gathered from FIGS. 3 to 9, the frame component 1 has a central web 2, an inner web 3, an outer web 4, a plurality of stringer recesses 5 and a plurality of reinforcing formations 6, 7, 8.

As can be seen in particular in FIG. 3, the central web 2 extends along the longitudinal direction L1 and defines the arcuate extent of the frame component 1. Furthermore, the central web 2 has an extent in a radial direction R1 running transversely with respect to the longitudinal direction L1, and comprises an inner edge region 21 with respect to the radial direction R1 and an outer edge region 22 which is positioned in an opposed manner to the inner edge region with respect to the radial direction R1. The central web 2 has a first surface 2a defining a first side 11 and a second surface 2b which is oriented in an opposed manner to the first surface and which defines a second side 12.

As illustrated in each case schematically and merely by way of example in FIGS. 5, 7 and 9, the inner web 3 is connected to the inner edge region 21 of the central web 2 and extends on the first side 11 and transversely with respect to the central web 2. In particular, the inner web 3 is bent away from the central web 2, i.e. is produced by a bending operation. The outer web 4 is connected to the outer edge region 22 of the central web 2 and likewise extends on the first side 11 and transversely with respect to the central web 2. The outer web 4 is also bent off from the central web 2. As is illustrated by way of example in FIGS. 5, 7 and 9, the inner web 3 and the outer web 4 can extend approximately parallel or parallel. In general, the central web 2, the outer web 4 and the inner web 3 together define a C-shaped cross section of the frame component 1.

The central web 2, the outer web 4 and the inner web 3 are produced as one piece from a metal sheet M. That is to say, the inner web 3 and the outer web 4 are each produced by bending over a rim region relative to a central region of a metal sheet M. The central web 2, the outer web 4 and the inner web 3 can therefore have a substantially constant thickness t1, which is shown in FIG. 5 by way of example between the first and the second surface 2a, 2b of the central web 2. The thickness t1 can be, for example, within a range of between 1.0 mm and 3.5 mm. The metal sheet M can be formed in particular from an aluminum material, for example an aluminum alloy, or a titanium material, for example a titanium alloy.

FIG. 3 illustrates by way of example that the frame component 1 has a plurality of stringer recesses 5 arranged spaced apart along the longitudinal direction L1. In general, at least one stringer recess 5 is provided. The stringer recess 5 can form in particular an interruption of the outer web 4 and extends in the outer edge region 22 of the central web 2 between the first and the second surface 2a, 2b. In general, the stringer recess 5 is therefore a stringer recess 5 which is formed in the outer web 4 and in the outer edge region 22 of the central web 2. As is illustrated by way of example in FIGS. 3 to 9, the stringer recess 5 in the central web 2 can have a substantially U-shaped design which is defined by a recess edge 50 of the central web 2. Of course, other geometrical shapes of the stringer recess 5 are also conceivable.

The central web 2 has at least one first reinforcing formation 6 which is in each case assigned to a stringer recess 5. Optionally, if a plurality of stringer recesses 5 are provided, each stringer recess 5 is assigned a first reinforcing formation 6. However, it is also conceivable for not all of the stringer recesses 5 to be assigned a first reinforcing formation 6. FIGS. 4 through 9 show by way of example various first reinforcing formations 6. As is illustrated by way of example in FIGS. 6 and 7, the first reinforcing formation 6 can be formed in particular by a recess edge 50 of the central web 2, the recess edge defining the stringer recess 5, being at least partially angled towards the first side 11. Accordingly, the portion of the edge 50 of the stringer recess 5 that is formed by the central web 2 is entirely or partially bent over towards the first side 11. It is illustrated by way of example in FIG. 5 that the recess edge 50 of the central web 2 is angled overall towards the first side 11. It is illustrated by way of example in FIG. 7 that the recess edge 50 of the central web 2 is partially angled towards the first side 11, wherein the reinforcing formation 6 protrudes increasingly further towards the first side 11 from a region of the recess edge 50 that adjoins the outer web 4 to an inner region with respect to the radial direction R1. The first reinforcing formation 6 is therefore generally positioned in the region of the stringer recess 5 and forms a protrusion on the first side 11 of the central web 2.

Alternatively or additionally to the angling of the recess edge 50 of the stringer recess 5, the first reinforcing formation 6 can also be in the form of a bead which is introduced from a second side 12 of the central web 2. This is illustrated by way of example in FIGS. 8 and 9. As can be seen in particular in FIG. 9, the bead in the second surface 2b of the central web 2 forms a depression and, in the first surface 2a of the central web 2, a corresponding elevation which therefore protrudes onto the first side 11 of the central web 2. As can be seen in FIGS. 8 and 9, the bead can be arranged with respect to the radial direction R1 between the inner edge region 21 of the central web 2 and the stringer recess 5. As is illustrated schematically in FIG. 8, the bead also extends along the longitudinal direction L1. The first reinforcing formation 6 is therefore generally positioned in the region of the stringer recess 5 and forms a protrusion on the first side 11 of the central web 2.

As is furthermore illustrated by way of example in FIGS. 3 through 9, the frame component 1 can have optional second reinforcing formations 7. These are optionally in the form of beads which are introduced in a bent region 23, which connects the inner edge region 21 of the central web 2 and the inner web 3, from the second side 12 of the central web 2 and form a protrusion on the first side 11 of the central web 2. This is illustrated in particular in FIGS. 5, 7 and 9. The bent region 23 is a region of the metal sheet M that has a curved profile with a bending radius and connects the central web 2 and the inner web 3. By pressing in the bent region 23 on the second side 12 or from the convexly curved side of the bent region, a bead is formed as a second reinforcing formation 7 which runs diagonally between the inner web 3 and the central web 2, as is illustrated purely by way of example in FIGS. 5, 7 and 9. The beads forming the second reinforcing formation 7 can each have a substantially identical extent in the radial direction R1 and in the longitudinal direction L1, as is illustrated by way of example in particular in FIGS. 4, 6 and 8, and can therefore be realized in general as punctiform beads. It is in each case illustrated purely by way of example in FIGS. 3, 4, 6 and 8 that a plurality of beads which are spaced apart along the longitudinal direction are provided as second reinforcing formations 7. In general, the frame component 1 can have at least one second reinforcing formation 7 in the form of a bead.

Figure 10:
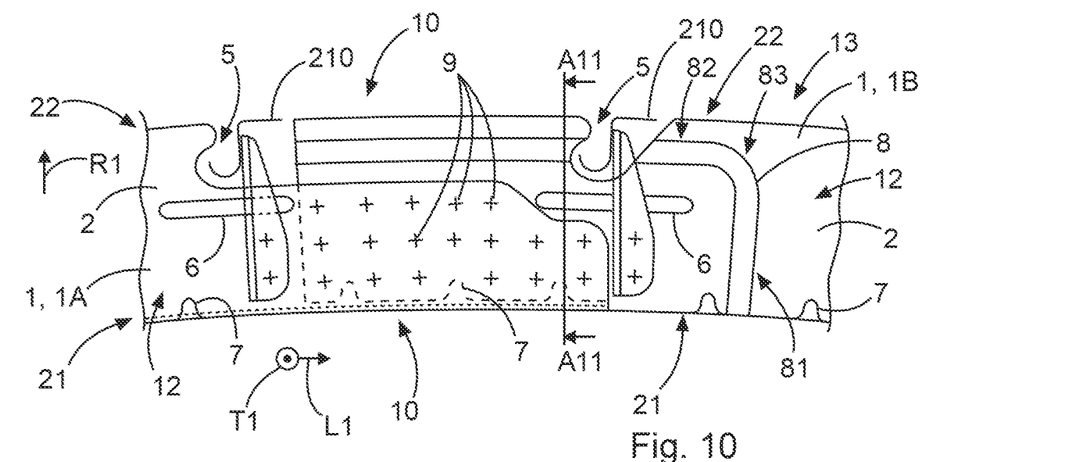
FIG. 10 shows a broken-away illustration of a connection of two frame components in a fuselage structure according to an exemplary embodiment of the disclosure herein.
Figure 11:
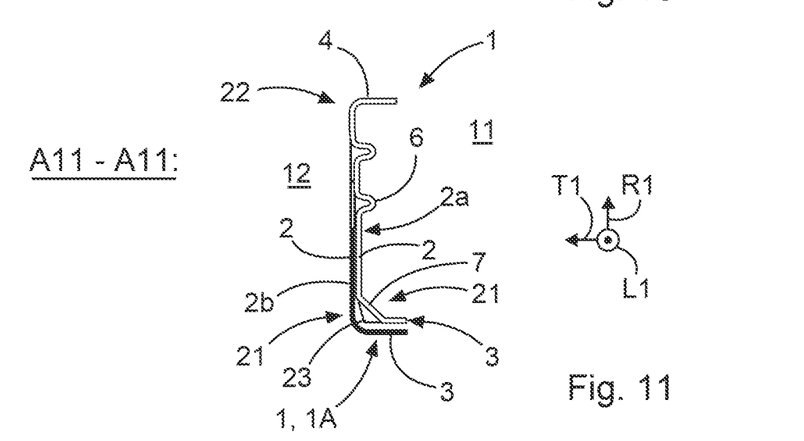
FIG. 11 shows a sectional view of the fuselage structure, the sectional view arising in a section along the line A11-A11 show in FIG. 10.
Figure 12:
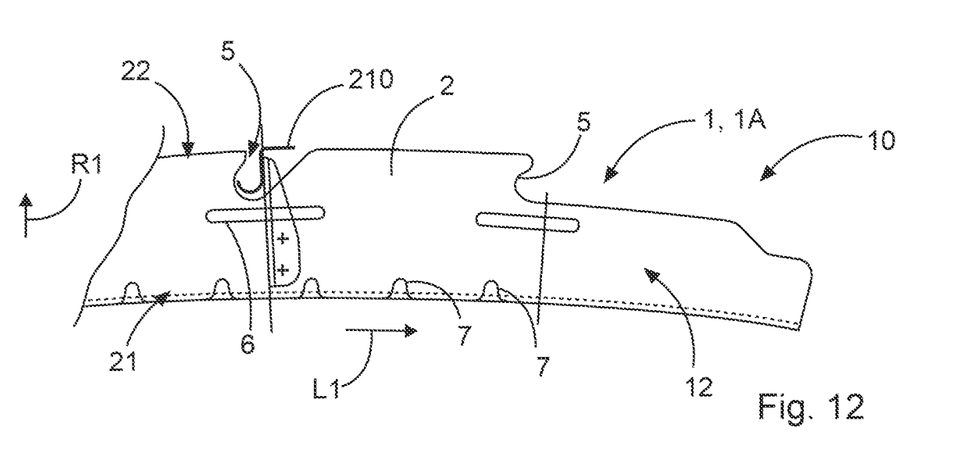
FIG. 12 shows a top view of a second side of a frame component in an end region and a connecting region according to an exemplary embodiment of the disclosure herein.
Figure 13:
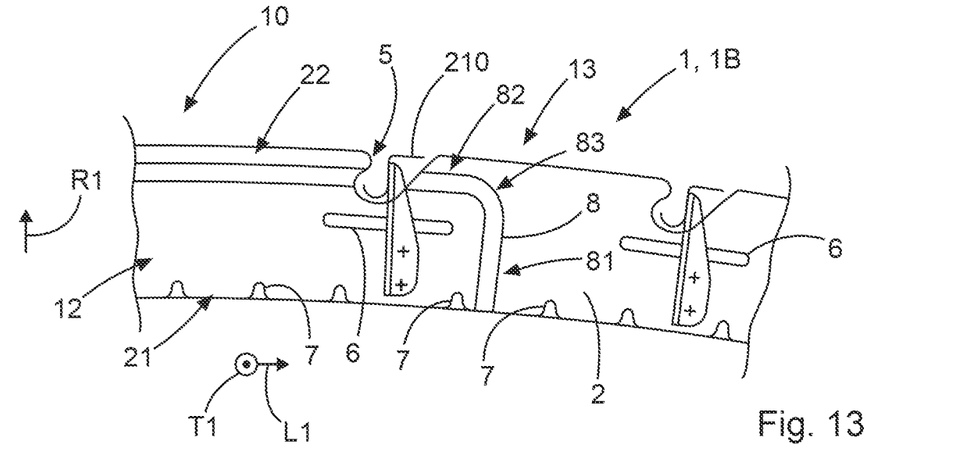
FIG. 13 shows a top view of a second side of a frame component in an end region and a connecting region according to a further exemplary embodiment of the disclosure herein.

For the connection to further frame components 1B, 1C, the frame component 1 can in each case have connecting regions 10 which are each formed at ends of the frame component 1 that are opposed with respect to the longitudinal direction L1, or form the ends. FIG. 10 illustrates purely by way of example a connection of a first frame component 1A to a second frame component 1B. FIG. 11 shows a sectional view of the frame components 1A, 1B connected to one another. FIG. 12 shows a top view of the second side 12 of the connecting region 10 of the first frame component 1A. FIG. 13 shows a top view of the second side 12 of the connecting region 10 of the second frame component 1B.

As can be seen in FIGS. 10 through 13, it can be provided in particular that an extent or a width of the central web 2 in the radial direction R1 is reduced in relation to an end region 13 adjoining the connecting region 10 in the longitudinal direction L1. As is illustrated by way of example in FIG. 12, it can be provided for this purpose that the outer web 4 ends at the connecting region 10. It can optionally also be provided that an edge of the central web 2 in the connecting region 10 extends with respect to the radial direction R1 level with a base of the stringer recess 5, as is likewise illustrated purely by way of example in FIG. 12.

Alternatively or additionally, it can be provided that the connecting region 10 is arranged relative to the end region 13 with an offset with respect to a thickness direction T1 extending transversely with respect to the radial direction and with respect to the longitudinal direction. For the connection to one another, the connecting region 10 of first frame component 1A is arranged overlapping in the longitudinal direction L1 with the connecting region 10 of the second frame component 1B. This is illustrated purely by way of example in FIG. 10. As can be seen in FIG. 11, it can be provided in particular that the frame components 1A, 1B are pushed one into the other. In particular, the central web 2 of the first frame component 1A lies with the first side 11 and the first surface 2a against the second side 12 or the second surface 2b of the second frame component 1B. The first and the second frame component 1A, 1B can be connected to one another in particular by rivets 9 which are illustrated merely symbolically in FIG. 10 in the form of crosses.

As is illustrated by way of example in FIGS. 10 and 13, the central web 2 can have, in the end region 13, an optional third reinforcing formation 8 in the form of a bead which is introduced from the second side 12 of the central web 2. It is illustrated purely by way of example in FIGS. 10 and 13 that the bead forming the third reinforcing formation 8 has a first region 81 extending along the radial direction R1 from the inner web 3, a second region 82 extending along the outer web 4 and a transition region 83 connecting the first and the second region 81, 82. The transition region 83 can have, for example, a curved profile, as is illustrated by way of example in FIG. 13. Optionally, the second region 82 extends beyond the stringer recess 5 or is interrupted by a respective stringer recess 5, as is likewise shown purely by way of example in FIG. 13. The first region 81 of the optional third reinforcing formation 8 extends in the radial direction R1 and the second region 82 extends along the longitudinal direction L1. It can therefore generally be provided that the bead forming the third reinforcing formation 8 extends at least partially or in sections along the radial direction R1.

Figure 14:
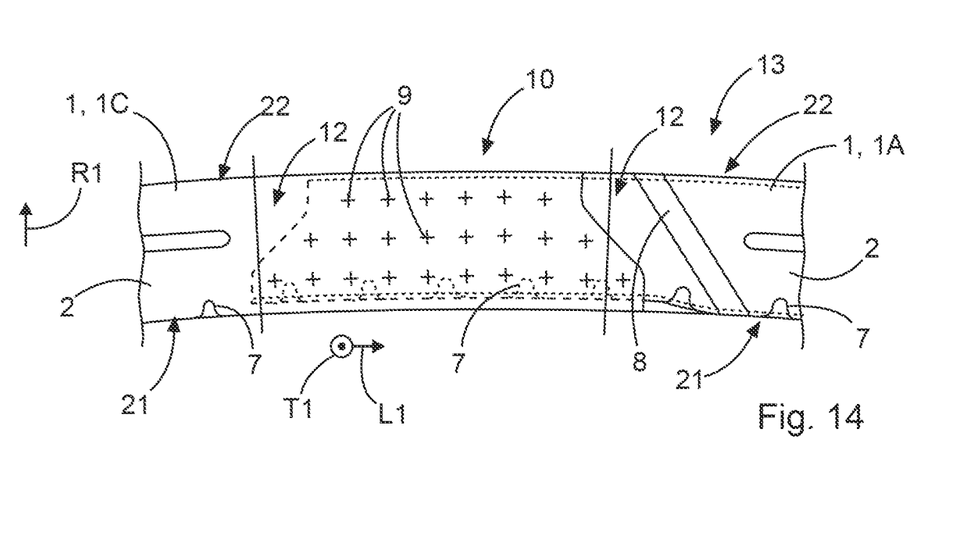
FIG. 14 shows a broken-away illustration of a connection of two frame components in a fuselage structure according to a further exemplary embodiment of the disclosure herein.

FIG. 14 is a purely schematic illustration of a connection between the first frame component 1A and a third frame component 1C. The connection can be realized in particular in the same manner as has been described above. As is illustrated by way of example in FIG. 14, the bead forming the third reinforcing formation 8 can also extend between the inner web 3 and the outer web 4. The bead can run linearly here, as illustrated by way of example in FIG. 14. FIG. 14 likewise shows by way of example an extent of the bead running obliquely with respect to the radial direction R1. It can therefore generally be provided that the bead forming the third reinforcing formation 8 extends at least partially or in sections along the radial direction R1.

Figure 15:
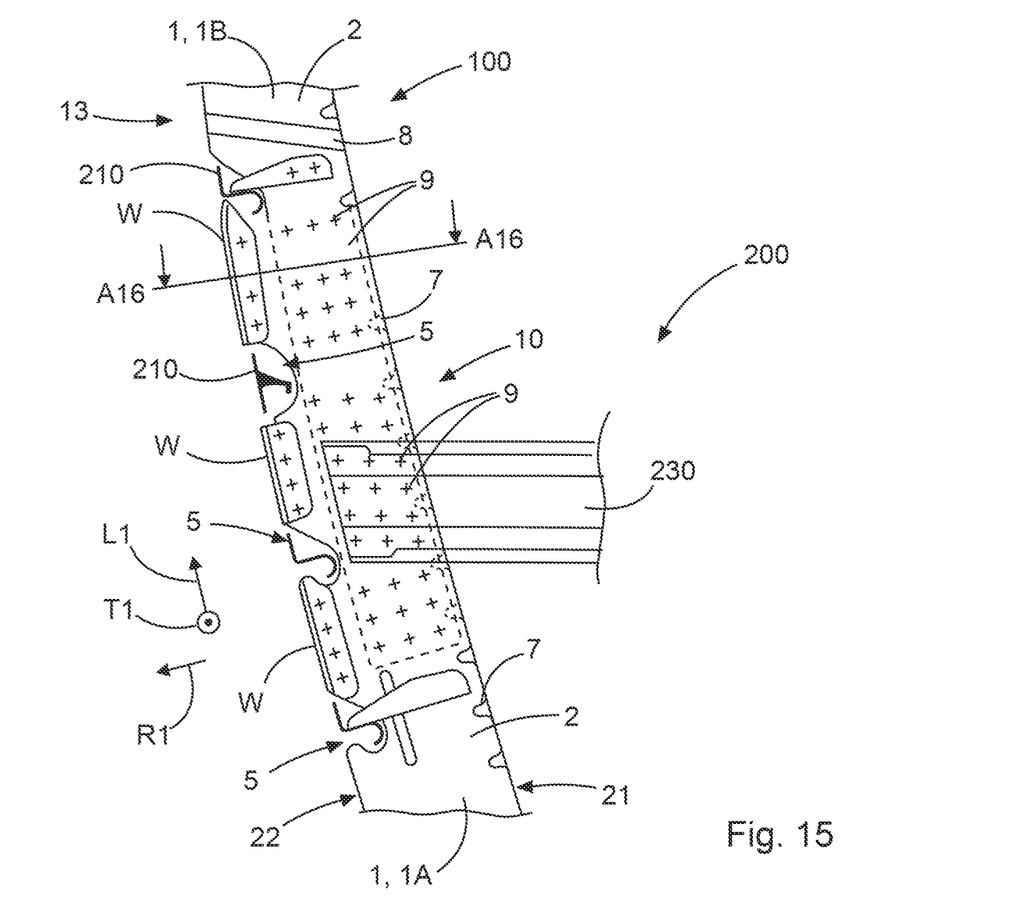
FIG. 15 shows a broken-away illustration of a connection of two frame components in a fuselage structure according to a further exemplary embodiment of the disclosure herein.

FIG. 15 illustrates by way of example a connection between two frame components 1A, 1B, wherein a crossmember 230 is additionally connected to the frame 100 formed by the frame components 1A, 1B. The crossmember 230 can be fastened in particular in the region of overlapping connecting regions 10 of the frame components 1A, 1B to the frame 100, for example by rivets 9, as is illustrated purely schematically in FIG. 15.

Figure 16:
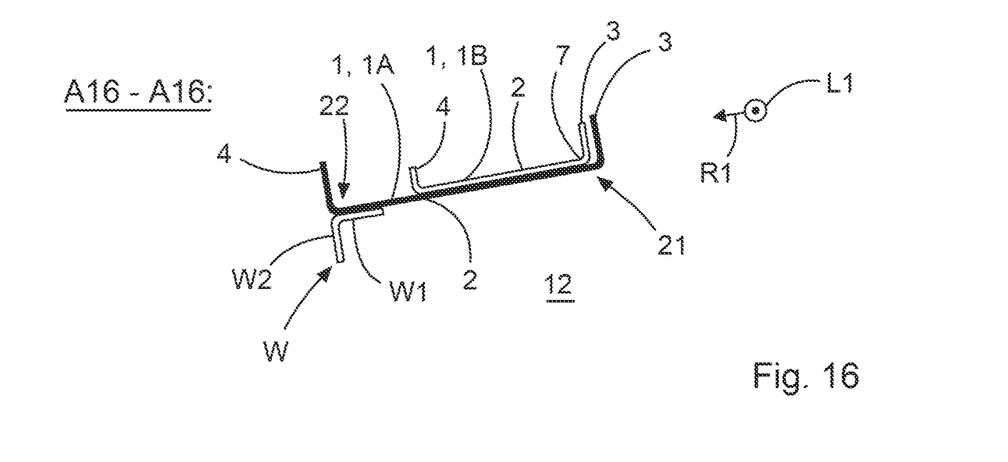
FIG. 16 shows a sectional view which arises in a section along the line A16-A16 shown in FIG. 15.

As is also illustrated in FIG. 15, the frame component 1 can optionally have one or more reinforcing brackets W. FIG. 16 shows by way of example a sectional view through the frame 100 along the line A16-A16 shown in FIG. 15. As can be seen in FIG. 16, the reinforcing bracket W can in particular have an L-shaped cross section which is defined by a base lug W1 and a transverse lug W2 extending from the base lug W1 and transversely with respect thereto. The reinforcing bracket W is connected by the base lug W1 to the outer edge region 22 of the central web 2, for example by rivets 9. In particular, the reinforcing bracket W is connected to the second side 12 or to the second surface 2a of the central web 2. As is illustrated by way of example in FIG. 15, the reinforcing bracket W is arranged adjacent to the stringer recess 5 with respect to the longitudinal direction L1. It is illustrated purely by way of example in FIG. 15 that a respective reinforcing bracket W extends between two adjacent stringer recesses 5. As can be seen in FIG. 16, the transverse lug W2 can be arranged in alignment with the outer web 4 with respect to the radial direction R1. FIG. 15 shows, purely by way of example, that a plurality of reinforcing brackets W are provided. Of course, just one reinforcing bracket W may also be provided. Furthermore, the at least one reinforcing bracket W can also be arranged in different regions than in the end region 13 or the connecting region 10 of the frame component 1.

Figure 17:
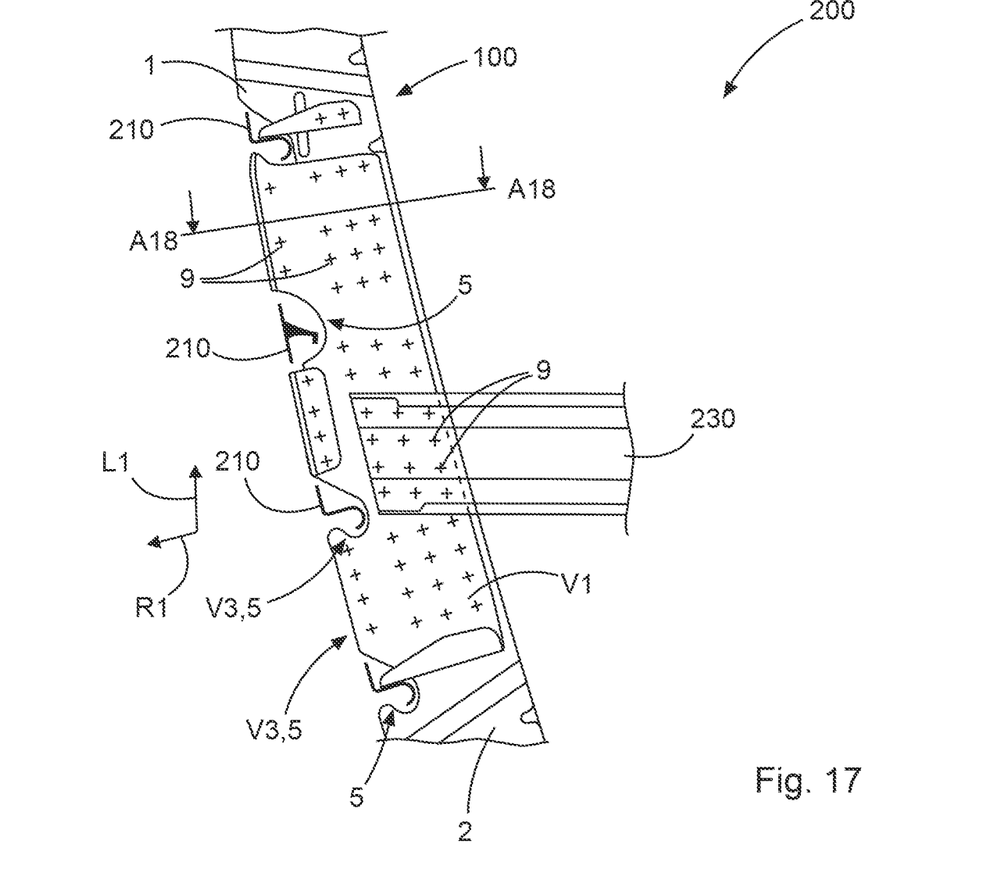
FIG. 17 shows a broken-away illustration of a frame component in a fuselage structure according to a further exemplary embodiment of the disclosure herein.
Figure 18:
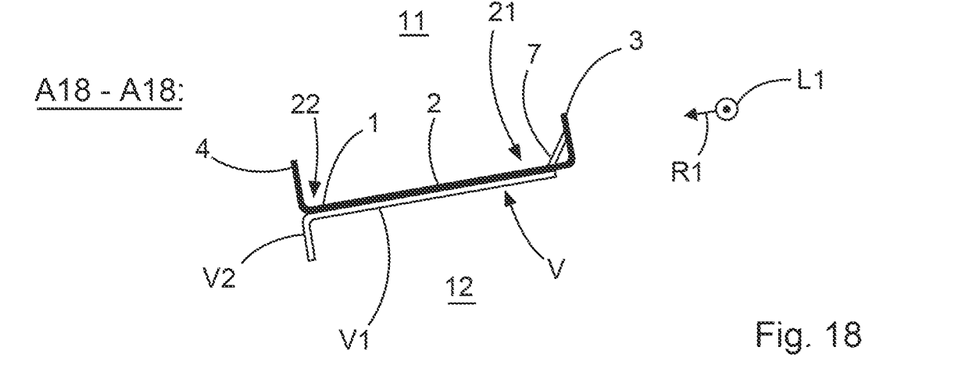
FIG. 18 shows a sectional view which arises in a section along the line A18-A18 shown in FIG. 17.

FIG. 17 illustrates by way of example a frame 100 which has a frame component 1 with an optional reinforcing profile V. As in FIG. 15, a crossmember 230 is additionally connected to the frame component 1 of the frame 100 in FIG. 17 too. As is illustrated schematically in FIG. 18, the reinforcing profile V has an L-shaped cross section which is defined by a plate portion V1 and a transverse web V2 extending transversely with respect to the plate portion V1. Furthermore, the reinforcing profile V has at least one profile stringer recess V3 which is optionally formed with the same cross-sectional form as a respective stringer recess 5 of the frame component 1. The optional reinforcing profile V is connected to the second side 12 of the central web 2, for example by rivets 9. In particular, the plate portion V1 lies against the second surface 2b of the central web 2. As is illustrated schematically in FIG. 18, the plate portion V1 can extend in particular between the inner edge region 21 and the outer edge region 22 of the central web 2. The transverse web V2 is arranged in the outer edge region 22 of the central web 2 and can be arranged, for example, in alignment with the outer web 4 with respect to the radial direction R1, as is illustrated by way of example in FIG. 18. The profile stringer recesses V3 are arranged in a corresponding manner to the stringer recesses 5 of the frame component 1 with respect to the longitudinal direction L1, and therefore the stringers 210, as illustrated by way of example in FIG. 17, can be guided through the profile stringer recesses V3 and the stringer recesses 5 of the frame component 1.

Figure 19:
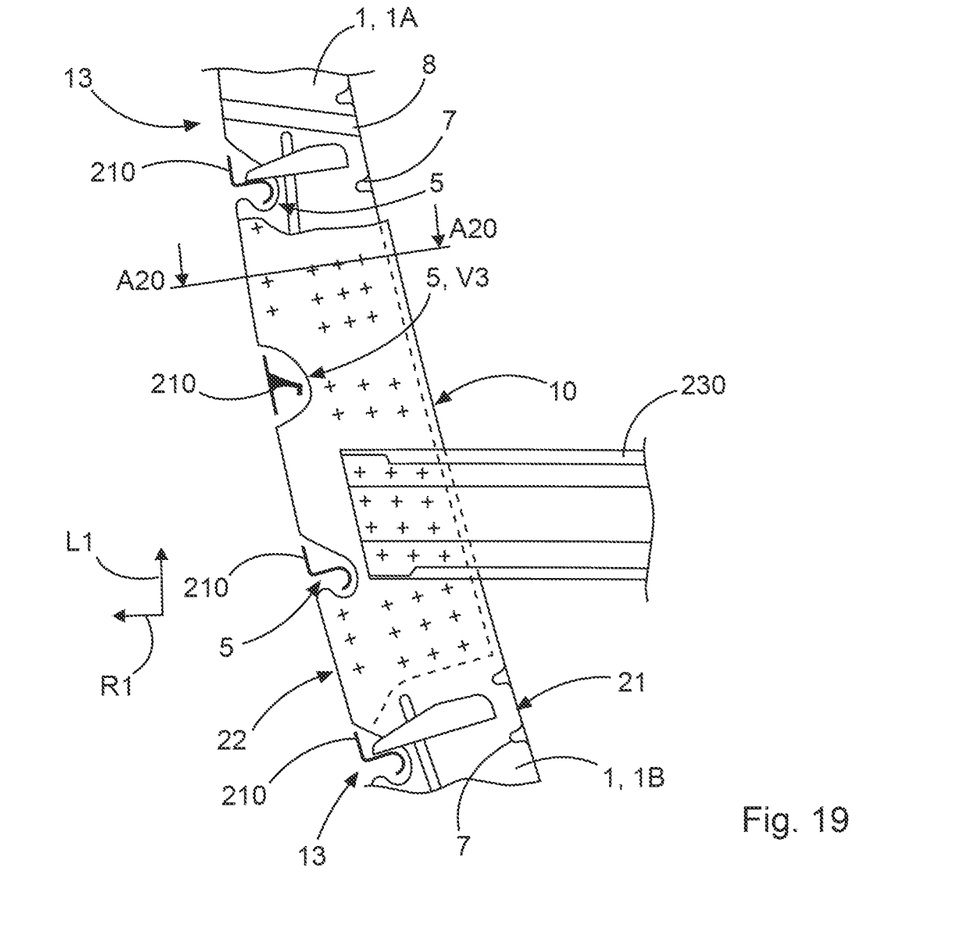
FIG. 19 shows a broken-away illustration of a connection of two frame components in a fuselage structure according to a further exemplary embodiment of the disclosure herein.
Figure 20:
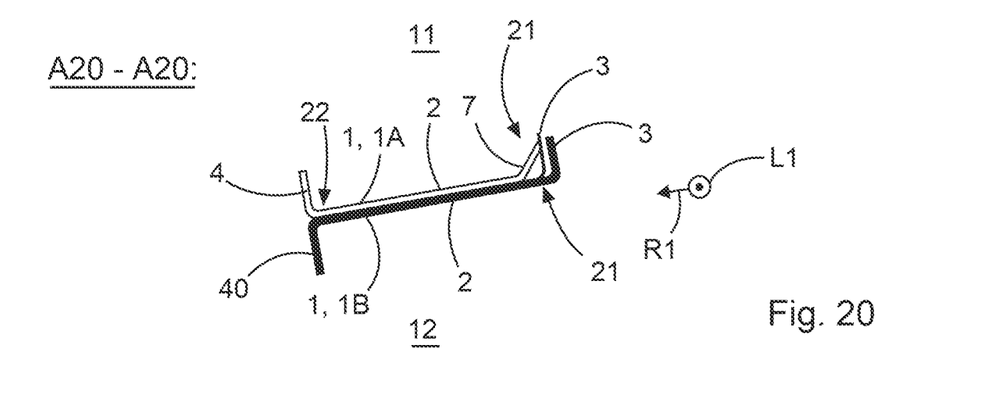
FIG. 20 shows a sectional view which arises in a section along the line A20-A20 shown in FIG. 19.

FIG. 19 illustrates by way of example a portion of a frame 100 in the region of a connection of two frame components 1A, 1B, wherein a crossmember 230 is fastened in the region of the overlapping connecting regions 10 of the frame components 1A, 1B to the frame 100. The connecting regions 10 of the frame components 1A, 1B can be substantially designed as described above. In particular, the outer web 4 of one of the frame components 1 can end in the end region 13 at the connecting region 10, as has been explained by way of example with respect to FIG. 12. As is illustrated purely by way of example in FIG. 20, instead of the outer web 4 which extends towards the first side 11, a stabilizing web 40 which is bent off from the outer edge region 22 of the central web 2 towards the second side 12 can be provided in the connecting region 10. The stabilizing web can be arranged optionally in alignment with the outer web 4 of the other frame component 1A with respect to the radial direction R1.

Figure 21:
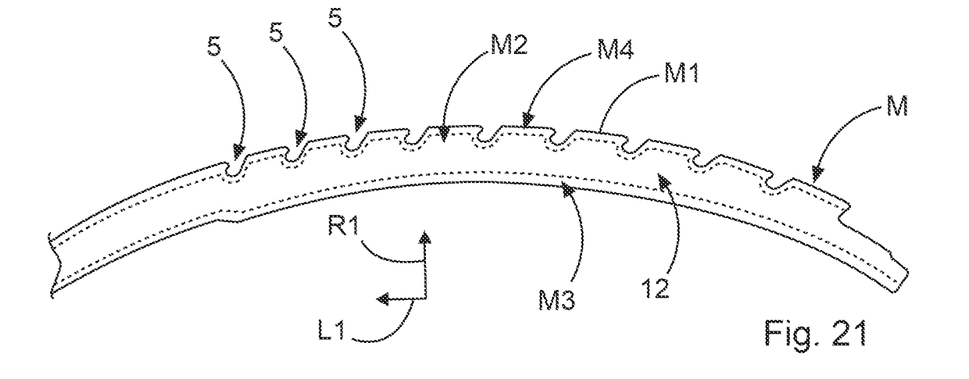
FIG. 21 shows a top view of a metal sheet after a first step of a method for producing a frame component according to an exemplary embodiment of the disclosure herein.
Figure 22:
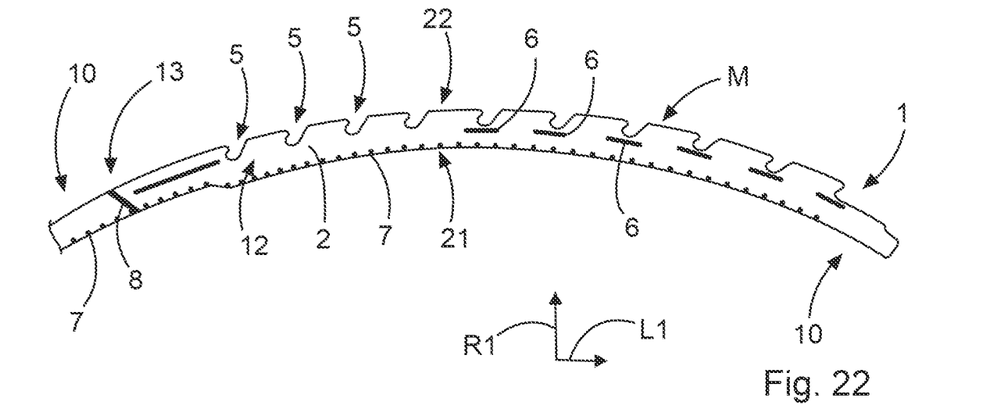
FIG. 22 shows a top view of the metal sheet after a further step of the method.
Figure 23:
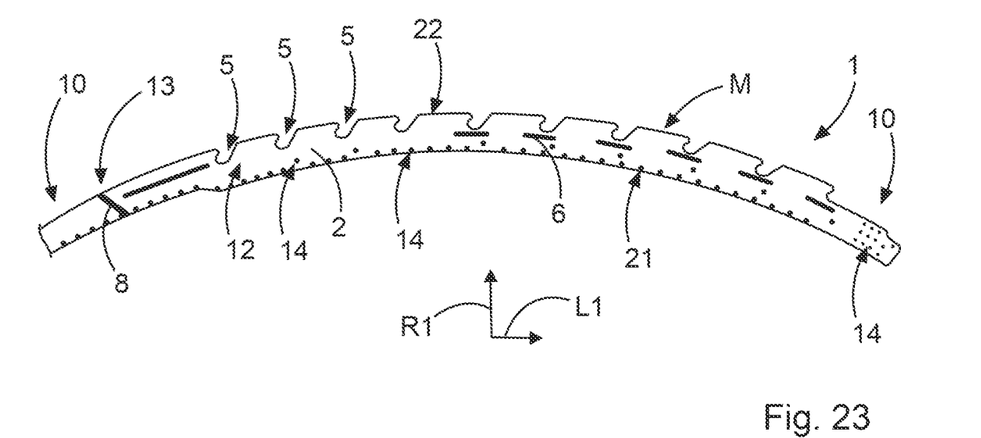
FIG. 23 shows a top view of the metal sheet after a further step of the method.

FIGS. 21 through 23 are a purely schematic illustration of the sequence of a method for producing a respective frame component 1. In a first step, a circumferential edge M1, which defines the at least one stringer recess 5, is formed on a metal sheet M by a machining process, in particular by milling or punching. The result of this step is illustrated in FIG. 21. Accordingly, the metal sheet M is worked on in a machining process in such a manner that the circumferential edge M1 defines a developed view of the frame component 1, wherein an inner rim region M3 with respect to the radial direction R1 is formed, which extends from the inner circumferential edge M1 and is provided for forming the inner web 3, an outer rim region M4 which is placed in an opposed manner to the inner rim region M3 in the radial direction R1 and extends from the circumferential edge M1 is provided for forming the outer web 4, and a central region M2 which is placed between the inner and the outer rim regions M3, M4 with respect to the radial direction R1 and is provided for forming the central web 2.

In a further step, the central web 2, the inner web 3 and the outer web 4 are formed by bending over the rim regions M3, M4 relative to the central region M2 of the metal sheet M. Subsequently or simultaneously with the bending over, the first reinforcing formation 6 can be realized by deforming the central web 2. In the same manner, the optional second and third reinforcing formations 7, 8 can be formed. The result of this forming is illustrated by way of example in FIG. 22.

In an optional further step, additional passage openings 14 can be pushed into the metal sheet M, in particular into the central web 2. This is illustrated by way of example in FIG. 23. The passage openings 14 can be provided, for example, for the passage of rivets 9, bolts, screws or the like.

Although the disclosure herein has been explained above by way of example with reference to exemplary embodiments, it is not restricted thereto, but rather can be modified in diverse ways. In particular, combinations of the above exemplary embodiments are also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Frame component
1A First frame component
1B Second frame component
2 Central web
2a First surface of the central web
2b Second surface of the central web
3 Inner web
4 Outer web
5 Stringer recess
50 Recess edge
6 First reinforcing formation
7 Second reinforcing formation
8 Third reinforcing formation
9 Rivets
10 Connecting region
11 First side
12 Second side
13 End region
14 Passage openings
21 Inner edge region of the central web
22 Outer edge region of the central web
23 Bent region
81 First region
82 Second region
83 Transition region
100 Frame
200 Fuselage structure
210 Stringer
220 Outer skin
230 Crossmember
300 Aircraft
310 Fuselage
320 Wings
330 Vertical tail
340 Tail plane
L1 Longitudinal direction
L200 Fuselage longitudinal axis
M Metal sheet
M1 Circumferential edge of the metal sheet
M2 Central region of the metal sheet
M3 Inner rim region of the metal sheet
M4 Outer rim region of the metal sheet
R1 Radial direction
T1 Thickness direction
V Reinforcing profile
V1 Plate portion
V2 Transverse web
V3 Profile stringer recess
W Reinforcing bracket
W1 Base lug
W2 Transverse lug

The invention claimed is:

1. A frame component for a frame of a fuselage structure of an aircraft, the frame component comprising:
   a central web which extends along a longitudinal direction and has an inner edge region with respect to a radial direction running transversely with respect to the longitudinal direction and an outer edge region with respect to the radial direction;
   an inner web which is bent from the inner edge region of the central web towards a first side;
   an outer web which is bent from the outer edge region of the central web towards the first side, wherein the central web, the outer web and the inner web are produced integrally from a metal sheet and together define a C-shaped cross section of the frame component; and
   at least one stringer recess which is formed in the outer web and in the outer edge region of the central web;
   wherein the central web has, in a region of the stringer recess, a first reinforcing formation which forms a protrusion on the first side of the central web; and
   wherein the first reinforcing formation is formed by a recess edge of the central web defining the stringer recess being at least partially angled towards the first side.

2. The frame component according to claim 1, wherein the first reinforcing formation is in a form of a bead which is introduced from a second side of the central web, is arranged with respect to the radial direction between the inner edge region and the stringer recess and runs along the longitudinal direction of the central web.

3. The frame component according to claim 1, wherein at least one second reinforcing formation in a form of a bead, which is introduced from a second side of the central web and forms a protrusion on the first side of the central web, is formed in a bent region connecting the inner edge region of the central web and the inner web.

4. The frame component according to claim 1, wherein the frame component has a connecting region for connection to a further frame component, which connecting region forms one end of the frame component in the longitudinal direction, and wherein the central web, at an end region adjoining the connecting region with respect to the longitudinal direction, has a third reinforcing formation in a form of a bead which is introduced from a second side of the central web, forms a protrusion on the first side of the central web and at least partially extends along the radial direction.

5. The frame component according to claim 4, wherein the third reinforcing formation extends between the inner web and the outer web.

6. The frame component according to claim 4, wherein the third reinforcing formation has a first region extending from the inner web along the radial direction, a second region which extends along the outer web and is optionally interrupted by a stringer recess, and a transition region connecting the first and the second region.

7. The frame component according to claim 4, wherein the connecting region of the frame component is arranged relative to the end region of the frame component with an offset with respect to a thickness direction extending transversely with respect to the radial direction and with respect to the longitudinal direction.

8. The frame component according to claim 1, comprising at least one reinforcing bracket which is connected to a second side of the central web in the outer edge region and is arranged adjacent to the stringer recess with respect to the longitudinal direction.

9. The frame component according to claim 1, comprising a reinforcing profile which is connected to a second side of the central web and has a plate portion, which extends between the inner edge region and the outer edge region of the central web, and has a transverse web, which extends transversely with respect to the plate portion and is arranged in the outer edge region of the central web, wherein the plate portion and the transverse web have a profile stringer recess formed in a corresponding manner to the stringer recess.

10. A frame for a fuselage structure of an aircraft, comprising at least two frame components according to claim 1, wherein the frame components are connected to one another at connecting regions arranged in an opposed manner with respect to the longitudinal direction, and form a closed frame structure, and wherein the first side of the central web of a first frame component is connected to a second side of the central web of a second frame component.

11. A fuselage structure for an aircraft, the fuselage structure comprising:
at least two frames arranged parallel to one another according to claim 10 and defining a fuselage longitudinal axis; and
at least one stringer which extends along the fuselage longitudinal axis and is arranged in the stringer recesses of the frames.

12. The fuselage structure according to claim 11, additionally comprising an outer skin connected to the outer webs of the frame components of the frames.

13. A method for producing a frame component comprising:
a central web which extends along a longitudinal direction and has an inner edge region with respect to a radial direction running transversely with respect to the longitudinal direction and an outer edge region with respect to the radial direction;
an inner web which is bent from the inner edge region of the central web towards a first side;
an outer web which is bent from the outer edge region of the central web towards the first side, wherein the central web, the outer web and the inner web are produced integrally from a metal sheet and together define a C-shaped cross section of the frame component; and
at least one stringer recess which is formed in the outer web and in the outer edge region of the central web;
wherein the central web has, in a region of the stringer recess, a first reinforcing formation which forms a protrusion on the first side of the central web;
the method comprising:
forming a circumferential edge, which defines the at least one stringer recess, on a metal sheet by a machining process;
forming the central web, the inner web, and the outer web by bending over rim regions, which extend from the circumferential edge, relative to a central region of the metal sheet, the central region forming the central web; and
forming the first reinforcing formation by deforming the central web by at least partially angling a recess edge of the central web defining the stringer recess towards the first side.

14. The method according to claim 13, wherein the circumferential edge is bent over and the central web is deformed in one step, in a mould, by deep drawing, pressing, or superplastic forming.

15. A frame component for a frame of a fuselage structure of an aircraft, the frame component comprising:
a central web which extends along a longitudinal direction and has an inner edge region with respect to a radial direction running transversely with respect to the longitudinal direction and an outer edge region with respect to the radial direction;
an inner web which is bent from the inner edge region of the central web towards a first side;
an outer web which is bent from the outer edge region of the central web towards the first side, wherein the central web, the outer web and the inner web are produced integrally from a metal sheet and together define a C-shaped cross section of the frame component; and
at least one stringer recess which is formed in the outer web and in the outer edge region of the central web;
wherein the central web has, in a region of the stringer recess, a first reinforcing formation which forms a protrusion on the first side of the central web; and
wherein:
at least one second reinforcing formation in a form of a bead, which is introduced from a second side of the central web and forms a protrusion on the first side of the central web, is formed in a bent region connecting the inner edge region of the central web and the inner web; or
the frame component has a connecting region for connection to a further frame component, which connecting region forms one end of the frame component in the longitudinal direction, and wherein the central web, at an end region adjoining the connecting region with respect to the longitudinal direction, has a third reinforcing formation in a form of a bead which is introduced from a second side of the central web, forms a protrusion on the first side of the central web and at least partially extends along the radial direction.

16. The frame component according to claim 15, wherein the third reinforcing formation extends between the inner web and the outer web.

17. The frame component according to claim 15, wherein the third reinforcing formation has a first region extending from the inner web along the radial direction, a second region which extends along the outer web and is optionally interrupted by a stringer recess, and a transition region connecting the first and the second region.

18. The frame component according to claim 15, wherein the connecting region of the frame component is arranged relative to the end region of the frame component with an offset with respect to a thickness direction extending transversely with respect to the radial direction and with respect to the longitudinal direction.

19. A frame for a fuselage structure of an aircraft, comprising at least two frame components according to claim 15, wherein the frame components are connected to one another at connecting regions arranged in an opposed manner with respect to the longitudinal direction, and form a closed frame structure, and wherein the first side of the central web of a first frame component is connected to a second side of the central web of a second frame component.

20. A fuselage structure for an aircraft, the fuselage structure comprising:
- at least two frames arranged parallel to one another according to claim 19 and defining a fuselage longitudinal axis; and
- at least one stringer which extends along the fuselage longitudinal axis and is arranged in the stringer recesses of the frames.

* * * * *